United States Patent [19]

Masiello

[11] Patent Number: 5,765,145

[45] Date of Patent: Jun. 9, 1998

[54] METHOD FOR PERFORMING DATE OPERATIONS ON DATE FIELDS SPANNING SEVERAL CENTURIES

[75] Inventor: Joseph A. Masiello, Washington, D.C.

[73] Assignees: B. Edward Shlesinger, Jr., Arlington; Michael J. Colton, Lake Ridge; Paul Pross; William D. Polkinghorn, both of Arlington, all of Va.

[21] Appl. No.: 903,181

[22] Filed: Jul. 28, 1997

[51] Int. Cl.⁶ .................................................. G06F 17/30
[52] U.S. Cl. ............................ 707/1; 707/104; 707/100
[58] Field of Search ......................... 707/1-3, 100-104; 345/326

[56]           References Cited

U.S. PATENT DOCUMENTS

| 896,255 | 8/1908 | Summerall | 40/111 |
| 3,916,172 | 10/1975 | Engle, Jr. | 235/92 |
| 5,596,554 | 1/1997 | Hagadorn | 368/82 |
| 5,600,836 | 2/1997 | Alter | 707/1 |
| 5,630,118 | 5/1997 | Shaughnessy | 707/200 |
| 5,655,319 | 8/1997 | LeCompte | 40/107 |

*Primary Examiner*—Thomas G. Black
*Assistant Examiner*—Hosain T. Alam
*Attorney, Agent, or Firm*—Shlesinger Arkwright & Garvey LLP

[57]           ABSTRACT

The present invention provides a system and method for processing computer date fields in two year format wherein the dates may occur in one of several centuries without the necessity of reformatting the two digit year date fields into a four digit year date field.

7 Claims, 1 Drawing Sheet

METHOD FOR PERFORMING DATE OPERATIONS ON DATE FIELDS SPANNING SEVERAL CENTURIES

FIELD OF THE INVENTION

The present invention relates to a method and system for modifying and operating a computer system to process date operations in which the date fields utilize only a two digit representation for the year, accompanied with the other date indicia, that includes the day of the week, month, and day, all of which are common in computer operating systems.

BACKGROUND OF THE INVENTION

This invention is based upon certain characteristics of the Gregorian calendar. Pope Gregory XIII, in the 1580's, assigned leap year days as February 29th for the years divisible exactly by four and with a leap year day of February 29th to fall on those century dates exactly divisible by 400. The century date 1600 was the first century date with a leap year day. A repeat of that leap year day (February 29) would not occur until the year 2000 for example. Thus, if we were to select century dates of 1900, 2000, 2100, and 2200, there would be no duplicate days of the week for any date spanning from Jan. 1, 1900 to Dec. 31, 2299. For example, Jan. 1, 1900 was a Monday. Jan. 1, 2000 is a Saturday. Jan. 1, 2100 will be on a Friday and Jan. 1, 2200 will be on a Wednesday. The span of 400 years is chosen to accommodate use in those computers that include the day of the week feature in their operating systems.

Other date spans are equally valid, according to choice such as a date span from Jan. 1, 1900 to Dec. 31, 2099. Present day microcomputers, as well as others, include the day of the week feature in their calendar, date, and time systems. Even the older microcomputers such as the '286's and 386's contain programmed day of the week indications for dates spanning from at least Jan. 1, 1980 to Dec. 31, 2099.

As the year 2000 approaches, serious data processing errors can be expected to occur in computer date field operations and indications using the two digit "YY" format for years since computers cannot distinguish the century values of 19YY from 20YY, 21YY, etc. Even now, date field operations requiring due dates, or other time critical dates occurring after Dec. 31, 1999 are failing to produce correct results.

In most existing personal computer operating systems, after rollover to Jan. 1, 2000, and thereafter, followed by power off, then rebooting, the failure rate to indicate the correct date will be extremely high. Estimates run in the 90% plus range.

Solutions to the year 2000 problems, known as the "Y2K" problem, include new BIOS means for personal computers, as well as total reformatting of all date fields within an application system for a computer into four digit representations for the years. These are costly and time consuming operations.

Prior art U.S. Pat. Nos. 5,600,836 to Alter, Feb. 4, 1997, and 5,630,118 to Shaughnessy, May 13, 1997 provide solutions that avoid the four year digit reformatting for computer application programs. These developments require costly programming because of the complex systems involved. These systems are designed primarily for main frame application programs and not standard P.C.'s and other microcomputers to include lap-top devices.

In summary, a present invention provides a system and method for processing computer date fields in two year format wherein the dates occur in one of several centuries without the necessity of reformatting the two digit year date field into a four digit year date field. The century determination process includes performing a matching data operation to locate the lone correct century value based upon the known day of the week in the date field for that date and within the span of the several centuries.

In the foregoing and other objects and advantages of this invention will be apparent from the following detailed description taken in connection with the accompanying drawing in which:

OBJECTS AND SUMMARY OF THE INVENTION

Figure 1:
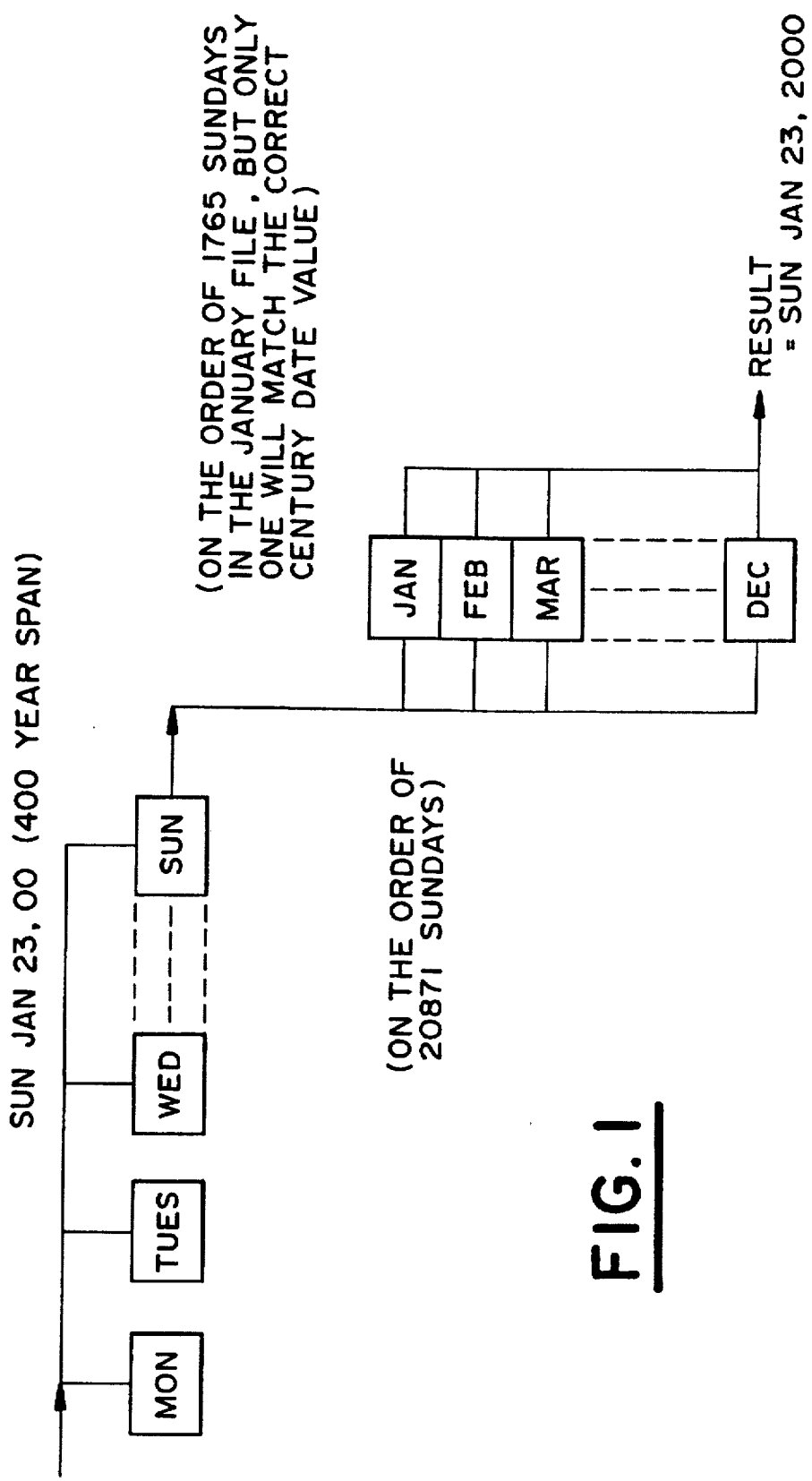
FIG. 1 is a flowchart of the invention.

It is an object of this invention to provide a simple inexpensive program adaptable for all types of computers including mainframes and microcomputers such as lap-top and desk-top devices.

Still another object of this invention is to provide a program which spans several centuries thus avoiding reformatting of the computer date fields.

A further object of this invention is to provide a program which will eliminate computer date field operation change of century errors which presently can cause improper results for date operations such as banking, stock market transactions, and other financial affairs.

Another object of this invention is to provide a safe date information system which prevents failure of military and space applications depending on accurate dates and particularly those involving recent satellite fixing and data transmission in the next century and eliminates the likelihood of transmittal of information which depends on specific calendar date.

Still another object of this invention is to provide a program which does not require the shutdown of the computer to install.

Yet another object of this invention is to provide a method of programming which can be achieved by using tables or formulation as may be contained in a patch file.

Another object of this invention is to be able to incorporate this invention into sub-routine systems that include date field calls.

A further object of this invention is to permit the data to reside on and to be transferred to and from a variety of devices such as magnetic disks, rigid or flexible, optical disks, or others and to permit the system to become an integral part of the computer, whether P.C. or other, by installation in the operating system.

These and other objects and advantages of the present invention will become apparent from a consideration of the following detailed description taken in conjunction with the accompanying drawings.

DETAILED DESCRIPTION OF THE INVENTION

In the invention as illustrated in FIG. 1, the chosen date span is incorporated in the patch file with lookup tables according to the day of the week, and as is desirable, further subroutined by months for each group of days of the week. In FIG. 1, it should be noted that not all the months and days of the week are shown but are to be included as noted by the dash lines. For example, if Sunday Jan. 23, 2000 is the date for the computer to run, the lookup for Sundays in the 400 year time span will contain on the order of 20,871 Sundays, starting with Sunday Jan. 7, 1900 and ending with Sunday Dec. 31, 2299. The January file for Sundays within this time span will contain on the order of 1765 Sundays.

The possible century values for Sun 01-23-00 as the date field will include 1900 for the "00", as well as 2000, 2100, and 2200. However, only one match will be found in the table for the Sunday value of "01-23-00", that being 2000, which is the correct date for the computer to run in this example.

In P.C. operation with this patch file, the booting routine will include the call and command for BIOS to execute the augmented functionality and indicate and provide for further use the entire correct century and date as "Sun Jan 23, 2000".

ALTERNATIVE EMBODIMENT

In the subsequent formulation of the invention, a simple mathematic process may be used to determine the correct century value for the date field, in lieu of using lookup tables. One example of a process could consist of performing a counting, storing, and comparing operation according to day of the week date shifts inherent in the Gregorian calendar. A reference starting date is selected, and as an example, Saturday Jan. 1, 2000 will be selected.

A determination with this process will operate by summing the three components of a date that generate week day shifts, these being the intracentury day shifts, the year day shifts, and the intercentury day shifts. With the Jan. 1, 2000 as a start reference date the intercentury day shifts will be set as 5 for common centuries and 6 for leap centuries, which 2000 is. Thus for 1900, the shift will be −5, for 2100 it will be plus 6, and for 2200, it will be plus 11. The intracentury century dates yield a two day shift forward in leap years, and a one day shift in all other years. In this process, the day shift totals of 7 and over are reduced to their 0–6 equivalents by reductions of 7.

As an example, the determination of the correct century value for the date field "Tues May 4-49" as displayed in a computer can be accomplished. The day shift process for intracentury shifts will total 62, 26 for the 13 leap years that have occurred prior to 49, plus 36 for the other years. This total, reduced by counts of 7 eight times yields a day shift of 6. In a similar manner, the week day shifts in the year 49, up to May 4, can be determined by reductions of 7 for the number of days that occurred since January 1 of that year. The value is 123 reduced by counts of 7 seventeen times, yielding a day shift of 4. This total of 6 plus 4 reduced by 7 yields a day shift of 3. The intercentury values of −5, 0 (for 2000), +6 for 2100, and +6+5 or 11, for 2200 can then be added to the 3 value to determine the correct century for the date "Tues May 4-49". For 1900, +3 and −5 yields a two day shift backward from the base day of Saturday to Thursday, not a match. For 2000, +3 as a shift forward yields Tuesday, which is the matching day of the week, and thus the correct century. A plus value of 6 for 2100 added to the 3 yields 9, reduced by 7, or 2, yields a shift to Monday, also, not a match. Similarly, 2200 with the plus 11 added to the 3, or 14 reduced by 7 twice for a 0 day shift, yields Saturday, not a match. Thus, the computer will now indicate the correct total date field value as "Tues May 4-2049", and will have this value available for further use.

Formulation for this day shift process can be presented as:

| INTRACENTURY Day Shifts (leap yrs = yr/4) $\frac{yr/4 \times 2 + (yr - yr/4)}{7}$ | + | YEAR Day Shifts No. of days since $\frac{\text{Jan. 1}}{7}$ | + | INTERCENTURY Day Shifts $C = 0$ (2000) $C = -5$ (1900) $C = +6$ (2100) $C = +11$ (2200) |
|---|---|---|---|---|
| Remainder (0–6) | + | Remainder (0–6) | + | C Value Comparisons |

(Yields the lone correct century date value for the day of the week for the specified date field)

Other embodiments of the invention for the correct identification of century values can also include subroutine systems that include date field calls, as in U.S. Pat. No. 5,630,118, provided that the date field has an indication for the day of the week. Any other computer operating system that includes the day of the week in the date field, for example main frames, can also utilize this century identification system. In these systems, microcode loading can be performed, as in live domain loading, for hardware architecture in the main frame units, by known techniques.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A method for operating a computer system and determining the correct century date for computer date fields having two years digits in the date field and with an indication for the day of the week for the correct century date including the steps of:

a) selecting a Gregorian calendar data base including a date span for the days of the week and date, including correct century date covering a continuous time period up to 400 years;

b) putting into a program file all the calendar dates from the Gregorian calendar data base of the days of the week and dates for a date span covering a continuous time period for at least portions of two consecutive centuries to obtain a date field criteria from said 400 years;

c) running a computer search to determine a single unique day of the week value for a correct century date within said 400 years having only two years digits in said date field valid for the date field criteria;

d) including in the computer system performance of date field operations the correct determined century date valid for the date field criteria having only two years digits in said date field;

e) whereby the computer system performance of date field operations will indicate and process the correct century date for the date span selected covering the continuous time period for at least said portions of said two consecutive centuries.

2. The method of claim 1 and including the step of:

a) providing said Gregorian calendar data base including a date span covering a continuous time period in a look-up table.

3. The method of claim 2 and including the step of:
a) providing including at least a continuous portion of the centuries of the time period from Jan. 1, 1900 to Dec. 31, 2299.

4. The method of claim 1 and including the step of:
a) providing a computer operating system based on day of the week shifts, inherent in the Gregorian calendar formation as divided into weeks, months, years and centuries.

5. The method of claim 1, and including the step of:
a) including a computer operating century determining means having a patch file for the computer operating system.

6. The method of claim 1, and including the step of:
a) including a call and subroutine operating system for computer applications for determining the date field determining and validating data for the single unique day of the week value for a correct century date valid for the date field criteria.

7. A method for operating a computer system and determining the correct century date up to 400 years for computer date fields with only two years digit in the field, and with the day of the week indication for the date as in claim 1, including the steps of:
a) providing day shifts data;
b) selecting a reference starting date having a known day of the week for the day shifts data;
c) providing an associative storage file from said day shift data to include intracentury day shifts data and year shifts data with intercentury day shifts data;
d) performing an associative storage file matching data operation to locate the lone match from the reference starting date that exists in the file for that date field with said only two years digits in the field; and
e) whereby the computer system will process the correct century date field data.

* * * * *